US005095933A

United States Patent [19]

Olejak

[11] Patent Number: 5,095,933

[45] Date of Patent: Mar. 17, 1992

[54] EXPANDABLE FLOAT ASSEMBLY FOR USE WITH AN ACCUMULATOR

[76] Inventor: Ingo Olejak, 6815 Farnaby Ct., Spring, Tex. 77379

[21] Appl. No.: 667,209

[22] Filed: Mar. 11, 1991

[51] Int. Cl.[5] ...................... F16L 55/04; F16K 31/24; F16K 33/00; F16K 43/00

[52] U.S. Cl. .................................. 137/207; 73/322.5; 137/315; 137/423; 137/433; 138/26; 138/30

[58] Field of Search ............... 73/322.5; 137/192, 207, 137/315, 397, 398, 399, 429, 430, 433, 439; 138/26, 28, 30, 31; 220/85 B

[56] References Cited

U.S. PATENT DOCUMENTS 4,278,105 7/1981 Koomey ............................ 137/433
4,714,093 12/1987 Kawano ............................ 138/30
4,823,827 4/1989 Olejak ............................ 137/433

*Primary Examiner*—George L. Walton
*Attorney, Agent, or Firm*—Alan R. Thiele

[57] ABSTRACT

An expandable float assembly is insertable through the lower valve bore in an accumulator or a hole in a tank. The assembly includes a sleeve member and a plurality of floatable arm members. The floatable arm members may be folded to a position substantially parallel to the sleeve members for insertion of the expandable float assembly into the accumulator or tank. After insertion of the expandable float assembly into the accumulator or tank the floatable arm members are deployed to a position substantially perpendicular to the sleeve member.

12 Claims, 2 Drawing Sheets

FIG.1
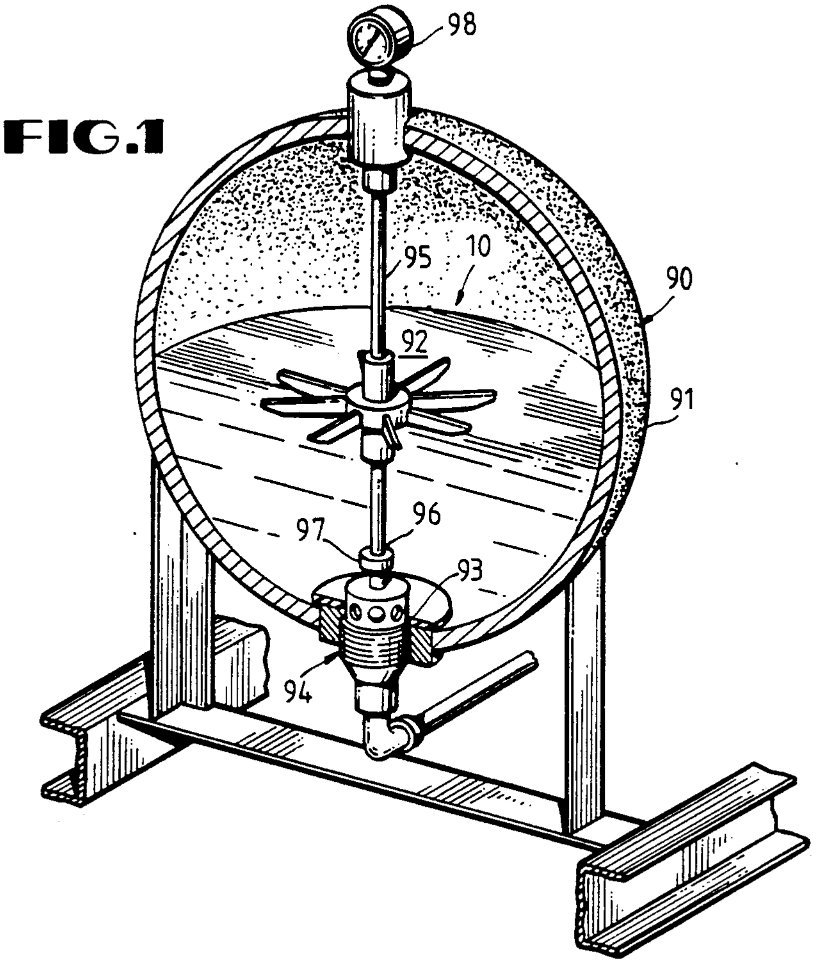
FIG.2
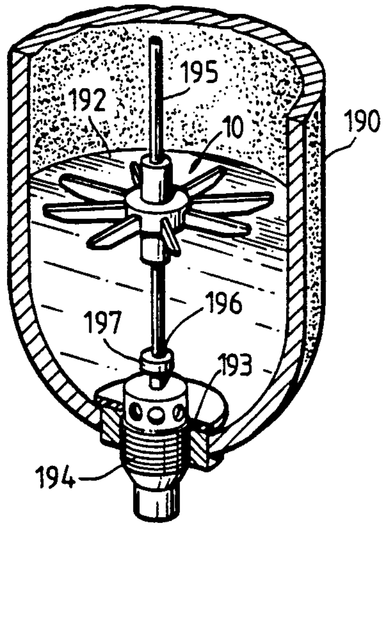
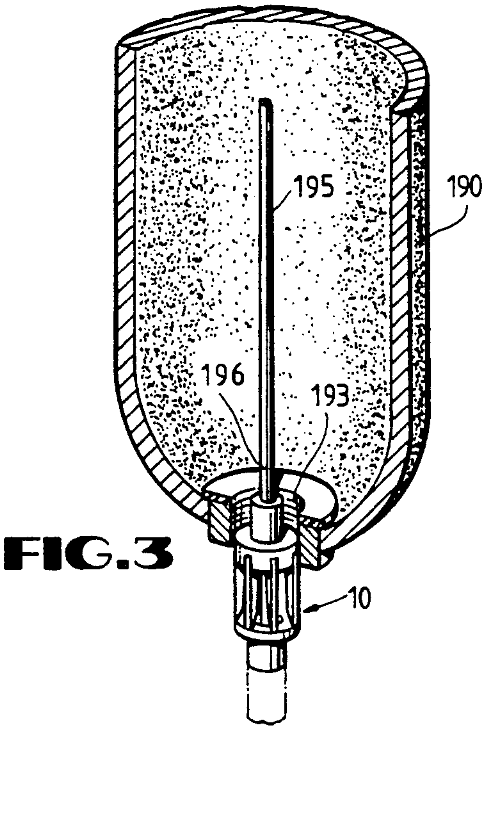
FIG.3

EXPANDABLE FLOAT ASSEMBLY FOR USE WITH AN ACCUMULATOR

BACKGROUND OF THE INVENTION

The present invention pertains to float assemblies; more particularly, the present invention pertains to float assemblies for use with accumulators or any tank type device in which a float is employed to rest on top of a fluid.

Accumulators are typically used in oilfield installations for the containment of fluid under pressure. These accumulators normally include a float which travels up and down a central guide rod in the center of the accumulator. When the float reaches a low level the weight or position of the float changes the condition of a valve located in a bore at the bottom of the accumulator. Because the float is the key to the operation of the accumulator it is necessary to open the accumulator housing (either cylindrical or spherical) to repair or replace the float assembly when the float assembly becomes inoperable. Opening of the accumulator housing is both inconvenient and expensive.

Floats are also used in a wide variety of other applications, the most common being to determine liquid level in the fuel tank of an automobile. In these applications there is also the need to provide a large opening in the tank through which the float may be serviced. If the tank operates at high pressure, the larger the float service opening, the greater the chance for leaks.

There is therefore a need in the art to provide a float assembly which may be repaired and replaced through a small opening in an accumulator housing or tank.

SUMMARY OF THE INVENTION

While it is to be understood that the described invention may be used with accumulators or tanks, the following description will concentrate on accumulators. Those of ordinary skill in the art will understand that the teachings set forth herein with regard to accumulators will also apply to tanks. There is disclosed herein an expandable float assembly which is insertable through the lower valve bore in a ball or bottle type accumulator.

The expandable float assembly of the present invention is built around a central sleeve member. Extending outwardly from the central sleeve member are a plurality of floatable arm members. Each floatable are member is hingedly attached to the central sleeve member. To insert the expandable float assembly through the lower valve bore in the ball or bottle type accumulator the floatable arm members are positioned parallel to or along the long axis of the central sleeve member. After insertion of the expandable float assembly through the lower valve bore in the ball or bottle type accumulator a spreader sleeve is moved into contact with the bottom of the floatable arm members. The spreader sleeve causes the floatable arm members to expand outwardly into a position substantially perpendicular to the central sleeve member. If desired a lock may be employed to lock the spreader sleeve in an axial position with respect to the central sleeve member.

In an alternate embodiment a fixed ring is attached to the sleeve members. Below the sleeve member is a slide ring. Attached above the slide ring and the fixed ring are float pieces. After the float assembly has been inserted through the lower valve bore in the accumulator the slide ring is moved toward the sleeve member. This movement causes the float pieces to move outwardly into a position substantially perpendicular to the sleeve member.

BRIEF DESCRIPTION OF THE DRAWINGS

A better understanding of the expandable float assembly of the present invention may be had by reference to the drawings wherein:

FIG. 1 is a perspective view of an "ball type" accumulator in partial section showing the expandable float assembly of the present invention in its expanded condition;

FIG. 2 is a perspective view of a "bottle type" accumulator in partial section showing the expandable float assembly of the present invention in its expanded condition;

FIG. 3 is a perspective view of the preferred embodiment of the float assembly as it is being inserted into a "bottle type"accumulator;

DESCRIPTION OF THE EMBODIMENTS

Figure 4:
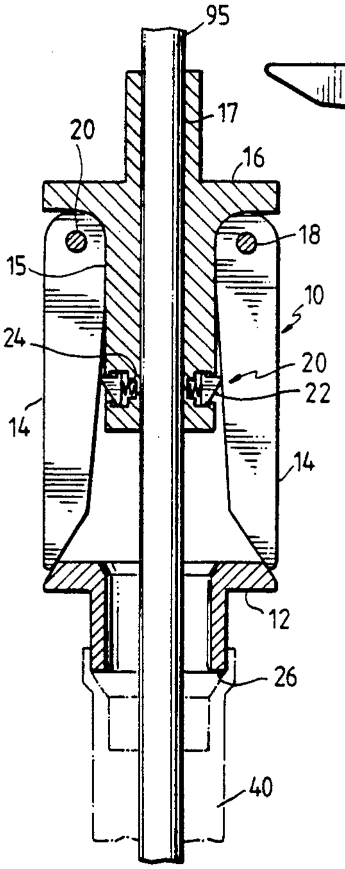
FIG. 4 is a front elevational view in partial section of the float assembly in its folded or unexpanded condition.

In FIG. 1 a ball type accumulator 90 is shown with the float assembly 10 of the present invention deployed therein. Characteristic of the ball type accumulator 90 is the outer housing 91 which is designed to both contain fluid 92 and to accommodate the lower valve bore 93. Threadably inserted into the lower valve bore 93 is a valve assembly 94.

Emanating upwardly from valve assembly 94 is a guide rod 95. At the bottom 96 of the guide rod 95 is a collar 97 which may be contacted by float assembly 10 when the fluid 92 in the accumulator 90 reaches a low level. The contact between the float assembly 10 and the collar 97 causes the weight of the float assembly 10 to change the condition of the valve 94. Normally, a pressure gauge 98 is located at the top of the accumulator 90. While a ball type accumulator is shown in FIG. 1, FIG. 2 illustrates a bottle or cylindrical type accumulator 190 containing the expandable float assembly 10 of the present invention. Homologus parts bear homologus numbers except that the number "1" has been placed in the hundreds place. Insertion of float assembly 10 is illustrated by reference to a bottle type accumulator 191 as shown in FIG. 3.

Figure 5A:
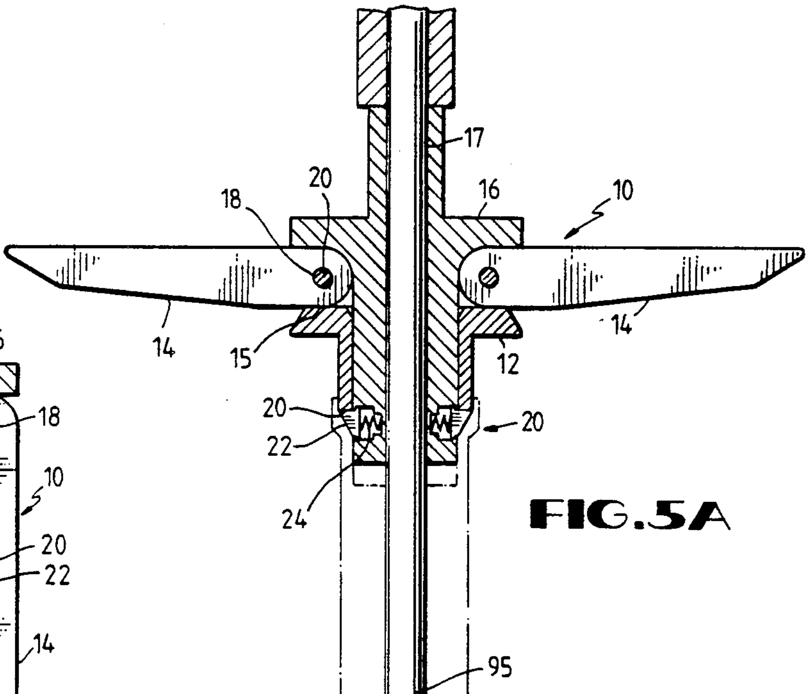
FIG. 5A is a front elevational view in partial section of the float assembly in its expanded condition.
Figure 5B:
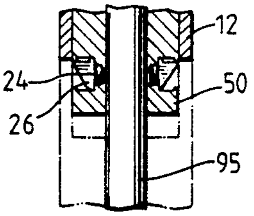
FIG. 5B is a detail sectional view illustrating how the float assembly may be returned to its folded or unexpanded condition.

As may be seen in FIGS. 4, 5A and 5B the preferred embodiment of the expandable float assembly 10 of the present invention consists of three essential parts: a spreader sleeve 12, floatable arm members 14, and central sleeve 16. Surrounding the vertical guide rod 95 is central sleeve member 16. The bore 17 in central sleeve 16 is sized so that sleeve 16 will freely move along the length of the guide rod 95. Hingedly attached to sleeve 16 are a plurality of floatable arm members 14. While eight floatable arm members 14 are shown in the preferred embodiment (FIGS. 1, 2 and 3) it will be understood that two or more floatable arm members 14 may be used without affecting the operability of the invention.

Floatable members 14 are hingedly attached 18 to central sleeve 16. This hinged attachment 18 allows for rotational movement of the floatable arm members 14 around a hinge pin 20. Accordingly, the floatable arm members 14 may be rotated 90 degrees to a position substantially perpendicular to bore 17 of central sleeve 16, as shown in FIG. 5A. It will be understood that a variety of hinge configurations such as a plastic molded hinge or a ball and socket joint may be used without departing from the scope of the invention.

Located underneath the floatable arm members 14 and around central sleeve 16 is a spreader sleeve 12. The spreader sleeve 12 is moved upwardly over central sleeve 16 to contact the lower surface 15 of the floatable arm members 14. As spreader sleeve 12 is moved further upward along central sleeve 16 it causes the floatable members 14 to deploy outwardly to a position substantially perpendicular to central sleeve 16. If desired a lock assembly 20 may be used to lock the spreader sleeve 12 into position with respect to central sleeve 16. Such lock may include a pin 22 which is spring 24 biased outwardly from central sleeve 16. When spreader sleeve 12 is in proper position with respect to central sleeve 16 pin 22 will contact the bottom 26 of spreader sleeve 12 and thus retain the spreader sleeve 12 in position with respect to central sleeve 16 much like the lock on an umbrella retains the arms of an umbrella in an extended position. Collapsing of the expanded float assembly as shown in FIG. 5B will be explained in the operation section which follows.

Figure 6:
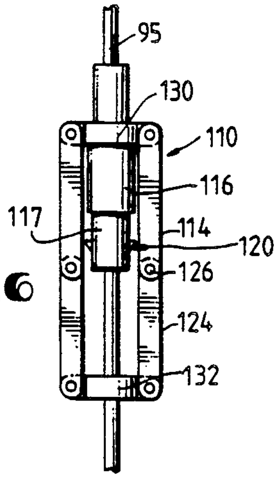
FIG. 6 is a front elevational view of an alternate embodiment of the present invention in its folded condition.
Figure 7:
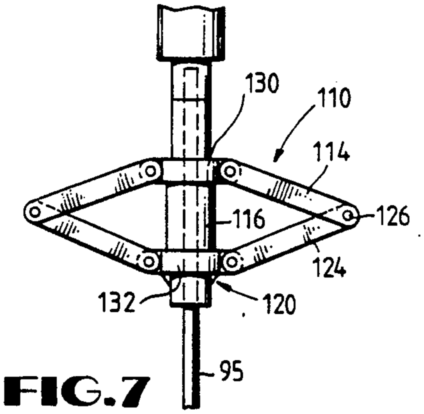
FIG. 7 is a front elevational view of the embodiment shown in FIG. 7 in its expanded condition.

In FIGS. 6 and 7 an alternate embodiment 110 of the expandable float assembly in the present invention is shown. Therein central sleeve 116 once again forms the basis of the invention. Central sleeve 116 surrounds guide rod 95. Attached to central sleeve 116 is fixed ring 130. Located under central sleeve 116 is slidable ring 132. Hingedly attached to the fixed ring 130 is a first float piece 114; hingedly attached to the slide ring 132 is a second float piece 124. First 114 and second float pieces 124 are then hingedly attached 126 together. As shown in FIG. 7 when slide ring 132 is moved along central sleeve 116 first 114 and second 124 float pieces move outwardly and away from central sleeve member 116. As first 114 and second 124 float pieces are hingedly or flexibly joined 126 one to another the movement of the slide ring 132 along sleeve 116 causes float pieces 114 and 124 to bow outwardly and thus forming a float substantially perpendicular to sleeve 116. In the preferred embodiment sleeve 116 includes a narrowed section 117 to guide and position lower ring 132.

OPERATION

Operation of the expandable float assembly 10 will be explained by reference to the preferred embodiment shown in FIGS. 1, 2, and 3. The slight difference in operation of the alternate embodiment 110 has been introduced and will be explained in greater detail.

The expandable float assembly 10 of the present invention may be installed in an accumulator 90 through the lower valve bore 93. Installation of the float assembly 10 is effected by causing the floatable arm members 14 to lie in a position substantially parallel to central sleeve 16 as shown in FIG. 4. After all the float members 14 have passed through the lower valve bore 93 the spreader sleeve 12 is pushed up along guide rod 95. This may be facilitated by the use of an installation sleeve 40 which will assist the operator in inserting the expandable float assembly 10 into the accumulator 90.

After the expandable float assembly 10 has been inserted into the accumulator 90 through the valve bore 93 the installation sleeve 40 is then used to push the spreader sleeve 12 upwardly. This upward movement of the spreader sleeve 12 will cause contact of the upper outwardly extending flange 13 of the spreader sleeve 12 with the underside 15 on the floatable arm pieces 14. This contact will have a cam effect on the floatable arm pieces 14 and cause them to move outwardly to a position substantially perpendicular with respect to central sleeve 16. If desired, an umbrella type lock assembly 20 may be used to lock the spreader sleeve 12 into position with respect to central sleeve 16.

The operation of the alternate embodiment 110 is shown in FIGS. 6 and 7. In FIG. 6, it may be seen that slide ring 132 is moved to a position below the central sleeve 117. In this lower position the first and second float pieces 114 and 124 lay substantially parallel to central sleeve 116 along guide rod 95. In this position assembly 110 may then be inserted through the lower valve bore 193. After having inserted the expandable float assembly 110 through the lower valve bore 193 the slide ring 132 is moved upwardly along the guide rod 95 thus causing the first and second float pieces 114 and 124 to bow outwardly. While a hinge connection 126 is disclosed for connection between the first and second float pieces 114 and 124, it will be understood that first and second float pieces 114 and 124, may be formed from a single member including a weakened or hinged portion 126 in its midst which will allow for the outward bending of the first and second float pieces 114 and 124. After the slide ring 132 has been moved toward central sleeve 116 it may be locked into position with respect to central sleeve 216 by a similar type of umbrella lock assembly 120 as shown in the preferred embodiment. Removal of the expandable float assembly is illustrated in FIG. 5B. Therein tool 50 is slid along guide rod 95 to cause pins 26 to move inwardly against springs 24. Spreader 12 may then be moved down thus allowing the float assembly to collapse into its folded or unexpanded condition.

The central sleeve may be made of metal or plastic or any other material which will slide easily along a vertical guide rod. The floatable arm members may be made of plastic or rubber or any other material which is readily floatable. The spreader sleeve may also be made of plastic or metal or any material which will slide along the sleeve member.

Construction materials for the alternate embodiments are similar to those disclosed for the preferred embodiment with the supplementary requirement that the materials from which the first and second float pieces are constructed will be of such density that they will readily float on the fluids normally stored in accumulators.

There is thereby provided by the expandable float assembly of the present invention a float device for insertion into the midst of an accumulator or tank.

It is also understood that the following claims are intended to cover all the various embodiments and specific features of the invention described above which may become apparent to those skilled in the art.

I claim:

1. An expandable float assembly for use in a tank comprising:
a sleeve member;
a plurality of floatable arm members hingedly attached to said sleeve member;
means for moving said floatable arm members from a position substantially parallel to said sleeve member to a position substantially perpendicular to said sleeve member;
whereby when said floatable arm members are substantially parallel to said sleeve member, said float assembly may first be inserted through an opening in the tank and then second said floatable arm members may be moved to a position substantially perpendicular to said sleeve member when inside the tank.

2. The expandable float assembly as defined in claim 1 wherein said means for moving said floatable arm members from a position substantially parallel to said sleeve member to a position substantially perpendicular to said sleeve member is a spreader sleeve.

3. The expandable float assembly as defined in claim 2 wherein said floatable arm members are spread by physical contact between the top of said spreader sleeve and the underside of said floatable arm members.

4. The expandable float assembly as defined in claim 3 further including means for locking said spreader sleeve in an axial position with respect to said sleeve member.

5. The expandable float assembly as defined in claim 4 wherein said lock assembly includes a spring loaded pin extending from said sleeve member.

6. A tank or accumulator system comprising:
a hollow container constructed and arranged for the containment of fluid;
a valve bore formed in the lower portion of said hollow within said valve bore;
a guide rod emanating upwardly from said valve into the tank or accumulator;
an expandable float assembly constructed and arranged to surround said guide rod, said float assembly including:
a sleeve member;
a plurality of floatable arm members hingedly attached to said sleeve member;
means for moving said floatable arm members from a position substantially parallel to said sleeve member to a position substantially perpendicular to said sleeve member;
whereby said expandable float assembly may be inserted into said hollow container through the lower valve bore when said floatable arm members may be moved into a position substantially perpendicular to said sleeve member; and
whereby said float assembly is constructed and arranged to travel along said guide rod and change the condition of said valve when the fluid within said hollow container reaches a predetermined level.

7. The system as defined in claim 6 wherein said means for moving said floatable arm members from a position substantially parallel to said sleeve member to a position substantially perpendicular to said sleeve member is a spreader sleeve.

8. The system as defined in claim 7 wherein said arms are spread by physical contact between the top of said spreader sleeve and the underside of said arms.

9. The system as defined in claim 8 further including means for locking said spreader sleeve in an axial position with respect to said sleeve member.

10. The system as defined in claim 9 wherein said lock assembly includes a spring loaded pin extending from said sleeve member and a compatible bore in said spreader sleeve.

11. An expandable float assembly for insertion through the lower valve bore in a ball or bottle type accumulator comprising:
a sleeve member;
a first ring fixedly attached to said sleeve member;
a second ring located under said sleeve member;
a first floatable arm member hingedly attached to said first ring.
a second floatable arm member hingedly attached to said second ring,
means for flexibly attaching said first and second floatable arm members together;
whereby said expandable float assembly may be inserted through the lower valve bore in an accumulator when said first and second floatable arm members are substantially parallel to said sleeve member and said first and second floatable arm member may be moved to a position substantially perpendicular to said sleeve member after insertion of the expandable float assembly through the lower valve bore in the accumulator.

12. The expandable float assembly as described in claim 11 wherein said means for flexibly attached said first and second float pieces together in a hinge joint.

* * * * *